United States Patent
Berberig et al.

(10) Patent No.: US 10,591,328 B2
(45) Date of Patent: Mar. 17, 2020

(54) ARRANGEMENT FOR TRANSMITTING AND/OR RECEIVING AN ULTRASONIC, WANTED SIGNAL AND ULTRASONIC, FLOW MEASURING DEVICE

(71) Applicant: Endress + Hauser Flowtec AG, Reinach (CH)

(72) Inventors: Oliver Berberig, Grenzach-Wyhlen (DE); Andreas Berger, Hasel-Glashutten (DE); Michal Bezdek, Aesch (CH); Pierre Ueberschlag, Saint-Louis (FR)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 309 days.

(21) Appl. No.: 15/521,393

(22) PCT Filed: Sep. 25, 2015

(86) PCT No.: PCT/EP2015/072054
§ 371 (c)(1),
(2) Date: Apr. 24, 2017

(87) PCT Pub. No.: WO2016/066342
PCT Pub. Date: May 6, 2016

(65) Prior Publication Data
US 2017/0307425 A1    Oct. 26, 2017

(30) Foreign Application Priority Data
Oct. 27, 2014    (DE) .................. 10 2014 115 592

(51) Int. Cl.
*G10K 11/00*    (2006.01)
*G01F 1/66*    (2006.01)
(Continued)

(52) U.S. Cl.
CPC ............ *G01F 1/662* (2013.01); *G01F 23/296* (2013.01); *G10K 11/002* (2013.01);
(Continued)

(58) Field of Classification Search
CPC . G01F 1/662; G01F 1/66; G01F 1/663; G01F 1/667; G01F 23/296;
(Continued)

(56) References Cited

U.S. PATENT DOCUMENTS 3,204,458 A * 9/1965 Gillen .................. G01F 1/665
73/596
4,755,975 A * 7/1988 Ito ....................... H04R 17/00
310/322

(Continued)

FOREIGN PATENT DOCUMENTS

DE    3219626 A1    12/1983
DE    10214187 C1    10/2003
(Continued)

OTHER PUBLICATIONS

German Search Report, German Patent Office, Munich, DE, dated Jul. 7, 2015.
(Continued)

*Primary Examiner* — Robert R Raevis
(74) *Attorney, Agent, or Firm* — Bacon & Thomas, PLLC

(57) ABSTRACT

An arrangement for transmitting and/or receiving an ultrasonic, wanted signal in a measured medium, comprising a vibration decoupling element for securing at least one ultrasonic transducer in a containment, characterized in that the vibration decoupling element has a platform for securing the vibration decoupling element to a sensor nozzle or to the containment and a second interface for securing an ultrasonic transducer. Between the second interface and the platform a vibration decoupling structural element is
(Continued)

arranged, which structural element is embodied as a solid body, which has one or more interfaces with other elements of the vibration decoupling element, especially with the second interface for securing the ultrasonic transducer and/or the platform, and wherein the structural element (11, 39, 55, 75) has an as much as possible spherical-, ellipsoidal-, toroidal- or polyhedral shape.

17 Claims, 10 Drawing Sheets

(51) Int. Cl.
*G01F 23/296* (2006.01)
*G01F 15/18* (2006.01)

(52) U.S. Cl.
CPC ............ *G10K 11/004* (2013.01); *G01F 15/18* (2013.01); *G01F 23/2968* (2013.01)

(58) Field of Classification Search
CPC .. G01F 23/2963; G01F 23/2968; G01F 15/18; G10K 11/002; G10K 11/004
USPC ............ 73/24.01–24.06, 32 A, 54.41, 61.75, 73/61.79, 596–634, 640, 641, 73/861.26–861.31, 290 V, 866.5, 861.18
See application file for complete search history.

(56) References Cited

U.S. PATENT DOCUMENTS

| | | | |
|---|---|---|---|
| 5,814,731 A * | 9/1998 | Alexander | ........... G01N 29/225 73/624 |
| 2007/0007721 A1* | 1/2007 | Schoen | ................. B65H 7/125 271/265.04 |
| 2013/0289593 A1 | 10/2013 | Hall et al. | |
| 2015/0057547 A1* | 2/2015 | Torashima | ............ B06B 1/0292 600/459 |

FOREIGN PATENT DOCUMENTS

| | | |
|---|---|---|
| DE | 102009039633 A1 | 3/2011 |
| DE | 102010064117 A1 | 6/2012 |
| DE | 102010064119 A1 | 6/2012 |
| DE | 102011006299 A1 | 10/2012 |
| DE | 102011090080 A1 | 7/2013 |
| DE | 102014000110 A1 | 7/2014 |
| DE | 102014115592 A1 | 4/2016 |
| EP | 1340964 A1 | 9/2003 |
| EP | 2148322 A2 | 1/2010 |

OTHER PUBLICATIONS

International Search Report, EPO, The Netherlands, dated Dec. 11, 2015.
English Translation of the International Preliminary Report on Patentability, WIPO, Geneva, CH, dated May 11, 2017.

* cited by examiner

ARRANGEMENT FOR TRANSMITTING AND/OR RECEIVING AN ULTRASONIC, WANTED SIGNAL AND ULTRASONIC, FLOW MEASURING DEVICE

TECHNICAL FIELD

The present invention relates to an arrangement for transmitting and/or receiving an ultrasonic, wanted signal, and to an ultrasonic, flow measuring device.

BACKGROUND DISCUSSION

It is known that, in the case of ultrasonic transducers, an as high as possible ratio of wanted signal (acoustic energy via the measured medium) to disturbance signal (acoustic energy via the measuring tube) is desired. This ratio is also referred to as the signal to noise ratio or SNR. A large SNR is especially desired in the case of ultrasonic, inline, flow meters (FM) used for gaseous media, because, in such case, the in-coupling of the acoustic energy from the hard, solid body transducer (with high acoustic impedance) into the soft, gaseous medium (with low acoustic impedance) is especially inefficient, thus significantly less energy can be in-coupled. In order to be able to safely receive and evaluate the low acoustic energy at the oppositely lying transducer, it is of decisive importance that disturbance signals, which e.g. travel via the measuring tube walls, be kept away from the oppositely lying transducer. For this, a high SNR is decisive.

Known from the literature and patent documents are a large number of approaches to solutions for this goal. Among these are that proposed in German patent, DE19723488A1, in which the US (ultrasonic) transducer is provided on the periphery with a number of rubber protrusions, which enable engaging the US transducer acoustically decoupled from the measuring tube in a recess with peripheral groove. For preventing an acoustic short-circuit between US transducer and measuring tube recess, it is proposed to fill the remaining annular gap with "permanently elastic, closed pore, polyurethane foam". A disadvantage of this solution is that, in the course of operating time of the US-FM, the polyurethane foam can change, such that it either loses its elastic properties or decomposes. In both cases, the acoustic decoupling effect is lost, leading to the result that the sound fractions traveling through solid structural elements, i.e. the structure-borne fractions, get continually stronger and, finally, an evaluation of the wanted signal is no longer possible.

Provided in European patent, EP1340964A1 is a geometry, which transfers radial oscillations of a sound producing plate via nested rings and sleeves, so-called filter elements, into a torsional deflection and thereby minimizes sound coupling into the housing attachment structure. A disadvantage of this solution is that the transducer housing is, due to the many filter elements, composed of a plurality of components, all of which must be connected durably sealed with one another. Moreover, the decoupling only functions against the axially recessed housing attachment: As soon as the annular gap between sound producing plate and transducer bore is shunted, be it by condensate or by solid deposits, the radial oscillation fractions are transmitted undamped to the measuring tube, and lost therewith is a safe evaluation of the wanted signal.

European Patent, EP2148322A2 discloses a US transducer housing, which likewise has structure-borne sound filter elements. The elements are, however, not placed directly against an axially and radially oscillating, sound producing plate, but, instead, placed a bit removed therefrom between such plate and a housing attachment to the measuring tube. The special feature of these filter elements is that at least two thereof are used, and that they have a resonant frequency matched to the sound production frequency. The disadvantages of this solution are identical to those relative to the geometry in European Patent, EP1340964A1.

Known from the state of the art is a relatively novel, generative manufacturing method, "selective laser melting", from a 1999 dissertation (Wilhelm Meiners: Direktes Selektives Laser Sintern einkomponentiger metallischer Werkstoffe (Direct selective laser sintering of single component metal materials), Dissertation, RWTH Aachen 1999). It was then decisively further developed at the Fraunhofer-Institute für Lasertechnik (for laser technology) (ILT) in Aachen in cooperation with Dr. Matthias Fockele and Dr. Dieter Schwarze. This method is distinguished by characteristics that the material to be processed is applied in powder form in a thin layer on a platform and then locally completely melted by means of laser radiation, so that, after solidification, a fixed and medium excluding, material layer forms. Then, the platform is lowered by a coating thickness and powder applied anew. This cycle is repeated, until all layers are regrown. Typical layer thicknesses for all materials are 20-100 μm. In such case, applied materials are many and include a large number of metals and metal alloys. The data for guiding the laser beam are produced by means of software from a 3D CAD body. In order to prevent contamination of the material with oxygen, the process takes place under a protective gas atmosphere of argon or nitrogen.

Compared to conventional manufacturing methods, such as e.g. casting methods, laser melting is distinguished by features including that tools or forms are not used (formless manufacturing), so that the prototype construction time or product introduction time can be reduced. Compared to the CNC (Computer Numerical Control) processing of semifinished products, there is the advantage of an immense geometric freedom, which enables component forms, which are not, or only with great effort, manufacturable with conventional methods. Included in this connection are, for example, undercuts or partitions in the 20 μm thickness range.

SUMMARY OF THE INVENTION

Starting from the above described state of the art, an object of the present invention is to provide vibration decoupling elements, which are embodied in compact construction and enable an effective vibration decoupling of structure-borne sound from a containment.

The terminology, structure-borne sound, refers to those piezoelement emitted sound fractions, which propagate exclusively in solid bodies. Since elastic solid bodies in contrast to a fluid can carry besides compressive and tensile stress also shear stresses, longitudinal and transverse waves can be distinguished in the case of structure-borne sound waves. Both wave types lead in the ultrasonic, receiving transducer to an excitation, which shows up in the electrical received signal to be evaluated. Since these excitations do not relate to the measured variable, they are disturbing, especially because they make difficult the evaluation of the wanted signal as regards the measured variable. For this reason, a maximum structure-borne sound decoupling is desired in US flow measuring devices and US fill level sensors.

The present invention achieves this object by a vibration decoupling element, i.e., an arrangement for transmitting and/or receiving an ultrasonic, wanted signal in a measured medium, which includes a vibration decoupling element for securing at least one ultrasonic transducer in a containment and the at least one ultrasonic transducer. An ultrasonic, wanted signal is, in such case, for example, a signal which contains information concerning the flow, the velocity of sound, the fill level and/or the type of measured medium, even including individual concentrations of a component in a substance in the form of a mixture. Ascertained from the ultrasonic, wanted signal can be e.g. a travel-time difference and/or a travel time in the particular measured medium.

The vibration decoupling element includes additionally a platform for securing the vibration decoupling element to sensor nozzles arranged on the containment or directly to the containment wall. The platform can be formed in different ways. It can, for example, be embodied plate shaped. In an especially preferred embodiment, the platform can be embodied as a curved plate. In this way, a connection can be made to the containment, so that a sensor nozzle becomes unnecessary. The platform and a first interface for holding the ultrasonic transducer serve as a reference points, between which a special structural element is arranged, which enables a vibration decoupling.

The platform includes the first interface, where the ultrasonic transducer is connectable to the containment or to a sensor nozzle arranged thereon, or is connected with the containment or the sensor nozzle. The containment can be, in the case of a flow measuring device, a measuring tube. In the case of fill-level measuring devices, it can be a tank. A sensor nozzle can especially be welded to the measuring tube or to the tank. This sensor nozzle serves for anchoring the arrangement to the measuring tube.

The terminology, interface, means in the context of the present invention a two dimensional area, where a form transition or a component transition occurs. A form transition is in this connection the transition from one geometric shape into another, e.g. the transition from a rod to a sphere. A component transition is, in contrast, the transition between two individual components, which are connected with one another. Usual joining technologies for joining two components together include, for example, the use of screws, adhesive or welding, wherein the mentioned interface is the area, where one component is adhered or welded with another. In the case of the use of one or more screw threads, the mentioned interface is e.g. the thread surface.

The vibration decoupling element includes additionally a second interface for holding an ultrasonic transducer. The ultrasonic transducer can be affixed to this second interface.

The ultrasonic transducer includes at least one piezoelement. The ultrasonic transducer can, however, also supplementally include a holder, or holding element, in which the piezoelement is arranged. It can especially also include a radiating element, e.g. with a radiating plate, and the ultrasonic signals of the piezoelement pass through the radiating element and travel toward the measured medium. The ultrasonic transducer can additionally include one or more coupling layers or matching layers. A preferred coupling layer is, in such case, a lambda/4 coupling layer.

The vibration decoupling element cares for a damping of vibrations, which are brought about by, among other things, the structure-borne sound. The vibration decoupling element can be geometrically embodied in different ways. The vibration damping can be achieved by different geometrical features, so that the vibration decoupling element can best be defined in a functional manner. The vibration decoupling, and vibration damping, of the vibration decoupling element can be defined in such a manner that the amplitude of the wanted signal transmitted in the medium, thus the actual measurement signal, under reference conditions and in the frequency range of the wanted signal, is more than 20 dB greater than the amplitude of the disturbance signal carried via the wall of the containment and caused by structure-borne sound. In the case of the aforementioned amplitudes, it is preferably the so-called peak-to-peak amplitude.

In a preferred embodiment, the amplitude, preferably the peak-to-peak amplitude, of the wanted signal transmitted in the medium, thus the actual measurement signal, is, under reference conditions and in the frequency range of the wanted signal, more than 30 dB, especially more than 40 dB, greater than the amplitude of the disturbance signal carried via the first interface and via the wall of the containment, as caused by structure-borne sound. A vibration decoupling of 30 dB, even 40 dB, can be achieved with the examples of embodiments illustrated in the figures.

The mentioned reference conditions are as follows: temperature=20° C., pressure in the containment, e.g. in the measuring tube or tank, i.e. on the in-coupling surface=1 bar absolute, the reference measured medium is air for measuring devices, e.g. flow measuring devices, which are designed as gas devices, or water for measuring devices, which are designed as liquid devices. Under reference conditions, the measured medium is not flowing in the measuring tube.

The ultrasonic, wanted signals are issued by an in-coupling surface directed at the measured medium. In contrast, the structure-borne sound disturbance signals are transmitted in all directions of the solid serving for securing the piezoelement. Thus, also a transmission to the containment, for example, to a measuring tube, takes place.

Associated with the in-coupling surface can be, among other things, a holding apparatus of the ultrasonic transducer. Alternatively, the in-coupling surface can also be part of an ultrasonic transducer seat, which, in this case, is associated with the vibration decoupling element.

The structural element is a solid body. This solid body includes, in each case, one or more interfaces with other elements of the vibration decoupling element. The thickness of the material of the interface(s) is especially more than two times smaller than the thickness of the solid. The aforementioned structural element has in the embodiment of the invention an as much as possible spherical-, ellipsoidal-, toroidal- or polyhedral shape, since these geometrical forms have proven to be especially favorable for sound decoupling. The reason for this is that the sound in these geometries is distributed and scattered relatively uniformly in all directions, whereby an especially high sound dissipation rate is achieved. Additionally, a sphere has only a single resonant frequency in all directions.

The one or more structural elements are, according to a further development of the invention, essentially solid. Especially, the mass of a structural element amounts to at least 80%, for example, at least 90%, preferably at least 95%, of the mass of a solid reference body with shape equal to that of the structural element and composed of the same material as the structural element. The mass differences compared with the reference body can arise from passageways present in given cases, for example, for electrical cable feedthroughs.

In order to avoid alternative solutions of structural elements, which have flattened regions in small surface portions, the structural element has an, as much as possible, spherical-, ellipsoidal-, toroidal- or polyhedral shape. With such a shape, one means, in the sense of the present invention, a body, whose surface can deviate by up to 50% of the maximum diameter of the particular structural element from the ideal contour in the sense of a profile form tolerance of a surface according to DIN ISO 1101 (current standard in the form at the priority date of first application). Preferably, the shape deviates by only 20% of the maximum diameter of the respective structural element from the ideal contour.

Other advantageous embodiments of the invention are subject matter of the dependent claims.

The vibration decoupling element can especially be constructed monolithically. Corrosion phenomena at possible seam locations or a loosening of individual geometrical elements as a result of fatigue phenomena at connecting locations are then advantageously avoided.

It is advantageous, when at least one connecting element between the structural element and other elements of the vibration decoupling element is embodied as a rod-shaped connecting element, so that this rod, or this strut, is compressed, stretched, bent or twisted in the case of structure-borne sound oscillations and thereby an additional contribution to the vibration decoupling is achieved. In a preferred embodiment, the rod-shaped connecting element can be embodied as a hollow strut.

Alternatively, the connecting element can also be embodied as a membrane.

The length of the rod-shaped connecting elements can preferably be greater than or equal to lambda/8, preferably greater than or equal to lambda/4, of the ultrasonic signal, in order so to achieve an especially effective vibration decoupling. Lambda is the wavelength of the ultrasound in the medium.

The vibration decoupling element can be embodied as a metal component. It is advantageously, at least in certain regions, composed of one of the following materials:
 a) steel, especially stainless steel or tool steel;
 b) titanium or a titanium alloy;
 c) a nickel based alloy;
 d) aluminum or an aluminum alloy;
 e) a chromium-cobalt-molybdenum alloy;
 f) a bronze alloy;
 g) a noble metal alloy;
 h) a copper alloy.

Preferred materials for the medium-contacting and therewith corrosion susceptible surfaces of ultrasonic, transducers are especially titanium and its alloys, nickel-based alloys as well as stainless steels. Especially preferable due to its relatively small density of about 4.5 kg/dm$^3$ and a therewith clearly smaller acoustic impedance compared with stainless steel at about 7.9 kg/dm$^3$ is titanium as material for the structure, which transmits the sound waves into the medium. On the other hand, titanium can, due to its high reactivity with many media at increased temperatures and/or increased pressure, only be very complexly mechanically worked. Therefore, a forming by means of selective laser melting is especially preferable.

The vibration decoupling element can advantageously have an integrally formed passageway for guiding an electrical current cable and/or signal cable, which passageway extends through the structural element. In this way, the electrical current cable and/or signal cable are/is protected against damage over a total course through the vibration decoupling element.

It is additionally advantageous for an improved vibration decoupling to provide an open structure between the second interface for holding the ultrasonic transducer and the platform.

The vibration decoupling element can preferably be produced by selective laser melting. Less preferred alternatives are especially casting methods, which require more time and are costly. Selective laser melting permits manufacture especially also of vibration decoupling elements with complex geometric structural elements for an especially good vibration decoupling or vibration damping in a more efficient manner.

Following their manufacture, components manufactured by means of selective laser melting have a certain surface roughness, which originates from their sequential layer structure. This can be detected both by the matt appearance of the compliments as well as also by noticeable irregularities when traveled over with a fingernail. In contrast, machined parts have, as a rule, a smooth surface, i.e. the surface is shiny, and a fingernail detects no irregularities.

In the case of selective laser melting (SLS), the minimum coating thickness of two adjoining powder layers amounts to about 20 μm. From this, it follows that structures, which extend in the vertical direction, likewise can only be resolved to this degree, i.e. the effective roughness has this order of magnitude. From this, it follows also that the surface quality of SLS components is only about half as smooth as typical machined parts. The average surface roughness Ra along a direction on the surface of the vibration decoupling element manufactured by selective laser melting amounts typically to greater than Ra=3.2 μm. The surface roughness can be ascertained by means of a roughness meter, e.g. the PCE RT 1200. Such a surface seems in the case of the traveling over with the fingernail to be slightly uneven, and also optically slightly uneven. The surface manufactured by laser melting, thus, is not shiny, but, instead, "dull".

The surface manufactured by laser melting can be further worked, especially smoothed. However, one can, depending on the type of subsequent working, still detect rough regions, especially at filigree or complex locations of the vibration decoupling element.

Solely by casting methods, especially by time-consuming and costly, lost wax casting- or creative casting methods, the subsequently described and in the figures illustrated vibration decoupling elements can be individually produced. However, casting methods are also subject to certain limits. Thus, selective laser melting permits manufacture of thinner walled membranes than in the case of casting methods.

The vibration decoupling element is directly insertable into an opening provided in the containment, especially without needing to use a sensor nozzle. For this, the vibration decoupling element is correspondingly geometrically embodied. There are, in such case, the most varied of geometry variants imaginable. Especially, the connection decoupling element has together with the outer wall of the containment a closed outer contour.

The vibration decoupling element can have an integrally formed passageway for guiding an electrical current cable and/or signal cable. This passageway offers protection against contact with the medium as well as against mechanical damage, and reduced contacting problems. Such a passageway is implementable, for example, likewise by selective laser melting and can in the case of the sequential construction of the vibration decoupling element be constructed with very filigreed shape and/or integrated in the one or more vibration decoupling elements.

The ultrasonic, flow measuring device of the invention can especially be operated according to the known principle of the travel-time difference method. Since ultrasonic transducers can be operated both in the transmitting mode as well as also in the receiving mode, a particular US transducer can serve both for transmitting as well as also for receiving ultrasonic wanted signals. Especially, the described flow measuring device has two arrangements of the invention, of which during a so-called ultrasonic shot one arrangement is located in sending, or transmitting, operation and one arrangement is located in receiving operation. The ultrasound wanted signals are measurement signals, which depend on a process variable, such as e.g. the flow or the fill level.

Especially preferably, the vibration decoupling element is applied in an ultrasonic, flow measuring device, which ascertains flow of gases. The working frequency of these devices is greater than 80 kHz, especially between 90 and 210 kHz, wherein the height of the utilized working frequency depends on the nominal diameter of the measuring tube and the measured medium. The working frequency range of a flow measuring device can, thus, be broadly selected and preferably lies between 20 kHz and 500 kHz, especially between 40 and 300 kHz.

The ultrasonic, flow measuring device in connection with the present invention is preferably a field device of process measurements technology.

In the following, other advantageous embodiments are explained in greater detail.

The vibration decoupling element includes, advantageously, a platform for securing the vibration decoupling element to the sensor nozzle or to the containment, as well as a second interface for holding an ultrasonic transducer, wherein between the second interface and the platform at least one structure with a closed outer contour is arranged, which structure bounds a hollow space, which is empty or filled with a vibration damping medium. The terminology, vibration damping, means, in such case, any material, in which the structure-borne sound is more strongly damped than in the wall material or the solid material of the vibration decoupling element. The vibration damping material can e.g. be of a chemically-identical material to the wall material manufactured via laser melting, wherein the vibration damping material is, however, present in powder form.

The vibration decoupling element, especially the above-described open structure or the totality of connecting elements and/or structural decoupling elements, has especially advantageously a rotational asymmetry, thus no rotational symmetry. Two dimensional objects are rotationally symmetric, when a rotation around the rotational axis by an angle causes the object to coincide with itself. In this way, a further improvement of the vibration decoupling is achieved.

As above described, the vibration decoupling element can contain a special structural element, which due to its geometry effects a strong damping of the structure-borne sound. In an especially preferred embodiment, two or more of these structural elements are combined with one another. Due to the geometric dimensions of the structural element and the small interfacial area, additional vibration damping can be achieved.

A housing is advantageously provided around the vibration decoupling element for preventing deposits on the vibration decoupling element. The housing can likewise be of a vibration decoupling structure. For instance, a large number of spheres can be connected with one another to form a membrane. Alternatively or supplementally to the housing, also a diaphragm can be provided, which is only connected with the measuring tube and has no contact surface with the vibration decoupling element.

Additionally to the aforementioned structural element, the vibration decoupling element can have a membrane, which is arranged especially between the interface of the vibration decoupling element with the measuring tube and the second interface for the ultrasonic transducer and serves to avoid fouling.

In an especially advantageous embodiment, the aforementioned membrane is utilized as bounding surface of a hollow space, which is arranged between the ultrasonic transducer and a structure connected with the measuring tube. This hollow space can be filled with a vibration damping material, e.g. with powder of the material, of which also the vibration decoupling element is corn posed.

The in-coupling surface is, in the case of application in an ultrasonic, flow measuring device, preferably set, i.e. inclined, relative to the longitudinal axis of the vibration decoupling element. The longitudinal axis of the vibration decoupling element can extend preferably perpendicularly to the longitudinal axis of the measuring tube. The in-coupling surface is preferably set at an angle between 20 to 70° to the longitudinal axis.

The inclination of the in-coupling surface can be achieved via a tilting of the ultrasonic transducer relative to one or more vibration decoupling, structural elements. In the case of a curved plate as platform, the structural elements can also even be already provided with the corresponding angle of inclination of the platform. A tilting is, in this case, not necessary.

In the case of the application of the arrangement of the invention in a tank for determining fill level, a tilting is not necessary.

The maximum deflections of the in-coupling surface of the ultrasonic transducer in sending/transmitting operation are, for instance, 200 to 800 nm in the case of 100 V transmission voltage and 20 to 80 nm in the case of 10 V transmission voltage. The deflection averaged over the entire reflection surface amounts to about 100 to 300 nm at 100 V, respectively 10 to 30 nm at 10 V. This holds for the usual ultrasonic, working frequency range. The deflections in receiving operation, to the extent that the ultrasonic transducer is located in the receiving mode, are some orders of magnitude less. The deflections of the structure-borne sound waves in the case of an arrangement without vibration decoupling element are generally also clearly smaller than the deflections of the respective in-coupling surface. Due to various factors, the deflections of the structure-borne sound waves are, however, difficultly quantifiable. In general, the vibration decoupling element brings about a weakening, i.e. damping or attenuation, of the structure-borne sound relative to the edge regions of the in-coupling surface of the ultrasonic transducer by at least 20-times. In widely predominant cases, even a structure-borne sound damping of greater than 100-times is achieved.

In summary, the vibration decoupling element of the invention or its preferred embodiments provide a series of advantages. On the one hand, the manufacture of an ultrasonic transducer securement to the measuring tube is achieved, which strongly damps the axial and radial oscillations of the in-coupling oscillatory element, i.e. the ultrasonic transducer, into the medium, so that such oscillations cannot appear as structure-borne sound disturbingly in the received signal.

Moreover, the number of components needed for a vibration decoupling element can be reduced to a minimum and, in the best case, to only one component.

While the component can be implemented in different ways, the manufacture of the above-described ultrasonic transducer securement to the measuring tube is achieved especially well by means of selective laser melting, wherein the material properties, especially the corrosion resistance, of the complement can be matched optimally to the particular application. Additionally, vibration decoupling elements can be implemented in comparatively short time with geometric elements, which can be integrated into the total structure of the vibration decoupling element and which individually, per se, bring about an attenuation of the structure-borne sound, i.e. a vibration decoupling between ultrasonic transducer and measuring tube, and which are also combinable with one another for improving such decoupling.

The vibration decoupling element can be secured both without seal as well as also with seal on a sensor nozzle or directly to the measuring tube.

Finally, the above described vibration decoupling securement for ultrasonic transducers of all types can be fitted to a wide range of tube shapes (i.e. tubes with round or rectangular cross section, triangular cross section, etc.).

BRIEF DESCRIPTION OF THE DRAWINGS

The invention will now be explained in greater detail based on some examples of embodiments presented in the drawing, the figures of which show as follows.

DETAILED DISCUSSION IN CONJUNCTION WITH THE DRAWINGS

Figure 1:
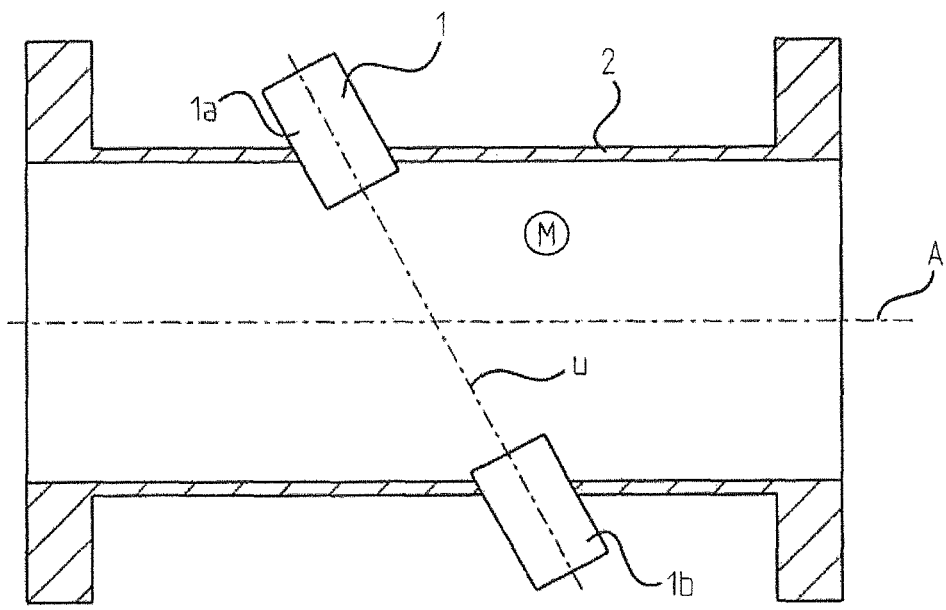
FIG. 1 is a schematic representation of an ultrasonic, flow measuring device.

FIG. 1 shows the general measuring principle of an ultrasonic, flow measuring device.

Ultrasonic, flow measuring devices are applied often in process and automation technology. They permit a relatively easy determination of volume flow and/or mass flow in a pipeline. Known ultrasonic, flow measuring devices work frequently according to the travel-time difference principle. In the case of the travel-time difference principle, the different travel times of ultrasonic waves, especially ultrasonic pulses, or so-called bursts, are evaluated relative to flow direction of the liquid. For this, ultrasonic pulses are sent, or transmitted, at a certain angle to the tube axis both with as well as also counter to the flow. From the travel-time difference, the average flow velocity can be determined along the ultrasound signal path and therewith, in the case of known flow state, and known diameter of the pipeline section, the volume flow.

The ultrasonic waves are produced and received with the assistance of so-called ultrasonic transducers 1. For this, the ultrasonic transducers 1 are mounted fixedly in the tube wall of the relevant pipeline section. Most often, the tube section is an integral unit of the flow measuring device and is referred to as measuring tube 2. Also clamp-on, ultrasonic, flow measuring systems are obtainable. The present invention concerns, however, ultrasonic, flow measuring devices, in the case of which the ultrasonic transducers are connected media contactingly with a media conveying measuring tube.

The ultrasonic transducers 1 include, normally, an electromechanical transducer element, e.g. a piezoelectric element. Furthermore, the ultrasonic transducers utilize a coupling layer for improved acoustic coupling and an adapting, or matching, layer, e.g. for gaseous media.

For reasons of stability under pressure, the measuring tube 2 is most often made of a metal, e.g. steel. In producing the one ultrasonic signal by an electromechanical transducer element of a first ultrasonic transducer 1a, a part of the ultrasonic signal can be transmitted to the measuring tube 2 and be transmitted as structure-borne sound to an electromechanical transducer element of a second ultrasonic transducer 1b. Such detects this structure-borne sound signal supplementally to the ultrasonic, wanted signal U that actually passed through the measured medium M, whereby a disturbance of the measuring occurs. Therefore, the ultrasonic transducer should as much as possible be decoupled from the structure-borne sound traveling in the measuring tube wall.

Figure 2:
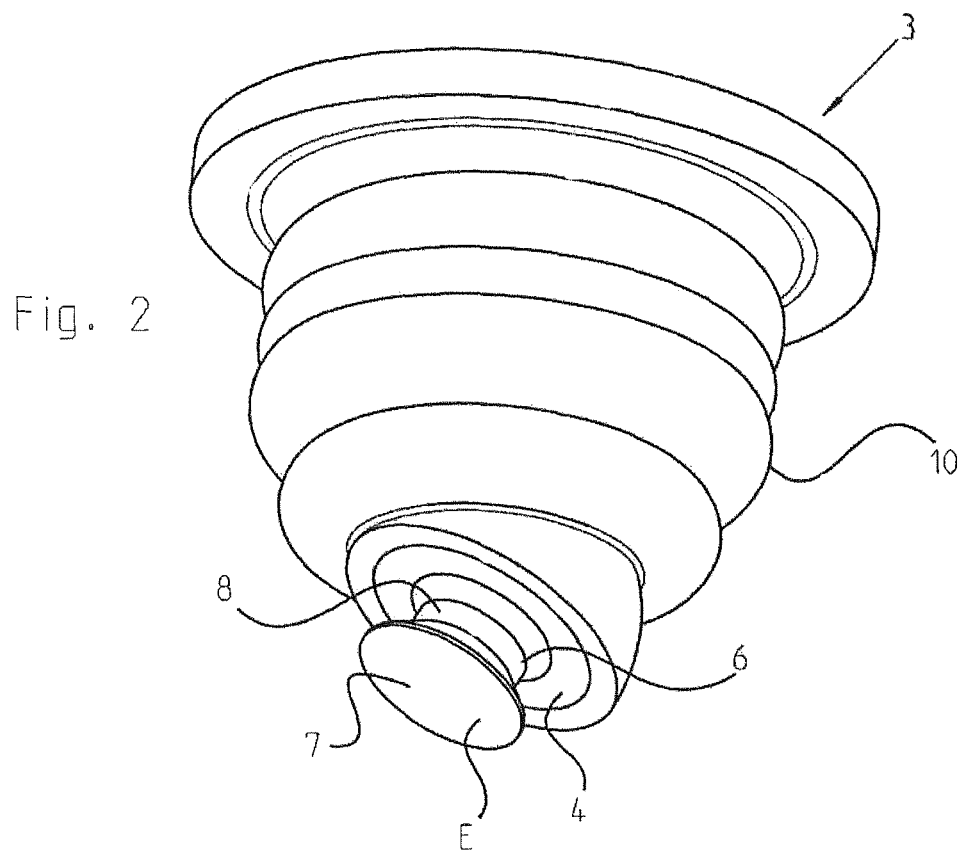
FIG. 2 is a lateral, perspective view of a first embodiment of an arrangement of the invention.
Figure 3:
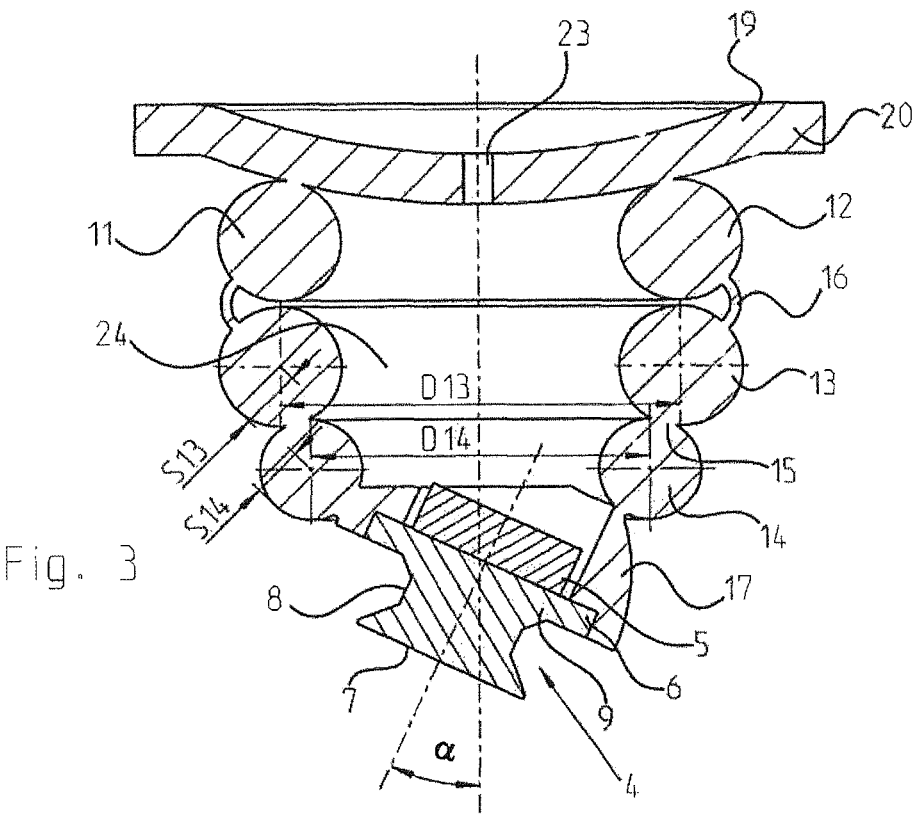
FIG. 3 is a sectional view of the arrangement of FIG. 2.
Figure 4:
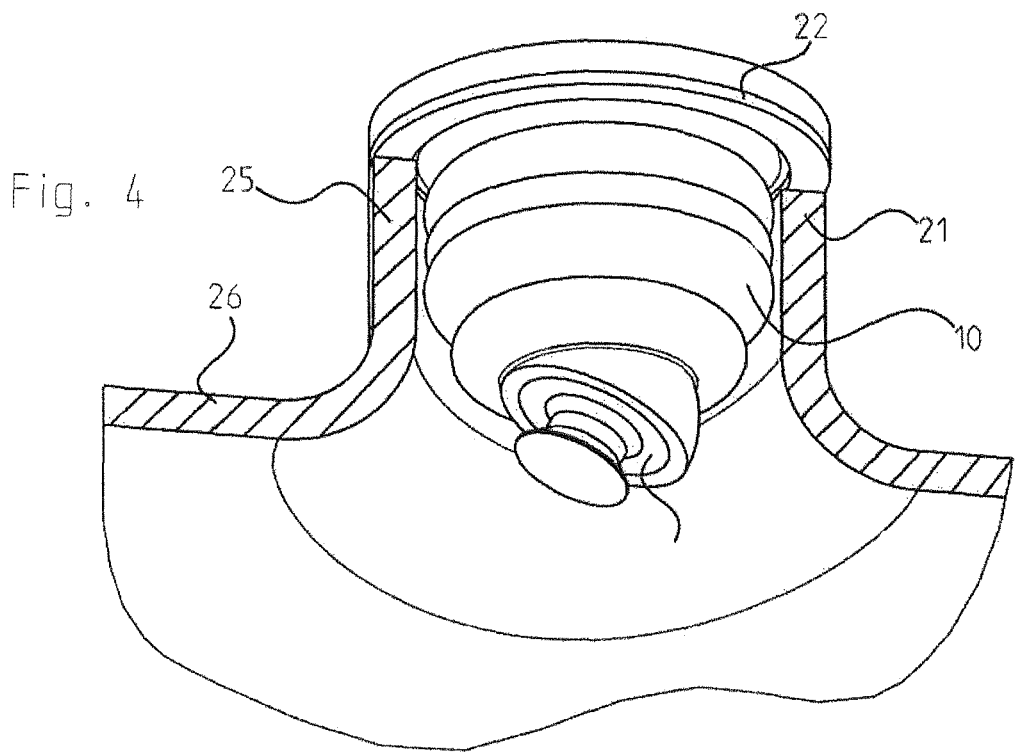
FIG. 4 is a installed position of the arrangement of FIG. 2 in a sectioned measuring tube.

FIGS. 2-4 show a first arrangement 3 of the invention, which is arranged in a sensor nozzle 25 on a measuring tube 26 and which has an ultrasonic transducer 4. The ultrasonic transducer 4 is composed of a piezoelement 5 and a metal holding element 6, in which the piezoelement 5 is arranged. Holding element 6 includes a radiating plate 7 with a coupling surface E, from which the ultrasonic signal is emanated toward the measured medium. This radiating plate is connected via a pedestal 8 with a body 9, which holds the piezoelement 5.

Holding element 6 is connected with a vibration decoupling element 10. Vibration decoupling element 10 has a vibration decoupling geometry.

The vibration decoupling element 10 of FIGS. 2-4 includes a number of structural elements 11, which are embodied in this example partially as oscillatory masses. These structural elements 11 are solid bodies, respectively solid elements, each of which has one or more interfaces with other elements of the vibration decoupling element 10. The thickness of the material at the one or more interfaces is especially more than two times smaller than the thickness of the solid.

The vibration decoupling element is preferably monolithically constructed and includes in FIGS. 2-4 three toroids 12-14 connected with one another.

Additionally, there is a seat 17 having an interface, where the holding element 6 of the ultrasonic transducer is arranged. In such case, the interface is oriented for holding the ultrasonic transducer in such a manner that the ultrasonic signal is radiated from the holding element 6 arranged in the seat 17 at an angle not equal to 90° to the measuring tube axis A, especially at an angle α between 20-40° to a perpendicular T to the measuring tube axis A.

Each torus 12, 13 or 14 is connected with at least one adjoining torus by direct surface contact 15 or by a membrane 16. The ring thicknesses S of the tori 12-14 can be equally large or differently large. The same holds for the diameters D of the tori 12-14. In practice, in FIGS. 2-4, the torus 14, which adjoins the seat 17 with the interface for holding the ultrasonic transducer, has a smaller ring thickness $S_{14}$ than the ring thicknesses $S_{12}$ and $S_{13}$ of the tori 12 and 13. Also, the diameter $D_{14}$ of the torus 14 is smaller than the diameters $D_{12}$ and $D_{13}$ of the tori 12 and 13. The ring thicknesses and diameters of the tori 12 and 13 are, in contrast, equally large.

Especially advantageous is when the vibration decoupling element 10 additionally has a membrane 16 as structural element. The membrane 16 should be deflectable in the case of small pressure differences between the inner space 24 and the environment of the arrangement. A corresponding membrane is e.g. arranged in FIGS. 2-4 between the tori 12 and 13. It closes the inner space of the arrangement from the environment, and cares in the case of low pressure differences, due to its very small cross sectional area, for an ultimate acoustic decoupling between the tori 12 and 13. If the external pressure exceeds the interior pressure significantly, then torus 13 is pressed against torus 12. In this way, there arises a line-like, solid contact, which due to its very small bearing surface likewise cares for a good, structure-borne sound decoupling.

Torus 12 is connected by an areal contact region with a closure plate, or plate-shaped platform, 19. Closure plate 19 includes a flange-like edge region 20. This flange-like edge region 20 serves for mounting on or to a sensor nozzle flange 21.

The flange-like edge region 20 can additionally have a seal 22, which is arranged on the vibration decoupling element 10 and in the mounted state lies against the sensor nozzle flange 21. Closure plate 19 includes additionally a passageway 23 for feedthrough of electrical connections and signal cable to the ultrasonic transducer 1, i.e. to the piezoelement 5.

As evident in FIGS. 2-4, the illustrated vibration decoupling element 10 is a structure with three structural elements 11 having a closed outer contour. Located within the vibration decoupling element is a hollow space 24, which is filled or unfilled with a vibration damping medium (e.g. potting compound or metal powder).

The geometric totality of the vibration decoupling body and the toroidal oscillatory elements 12-14 in particular achieve a significant reduction or a complete canceling of the structure-borne sound. Therewith, the piezoelement can send US signals to the medium, without that a structure-borne sound signal is transmitted via the measuring tube to the receiver. In the case of the flow measurement of fluids, and especially in the case of the flow measurement of gases, the vibration decoupled seating of ultrasonic transducers is, consequently, especially advantageous.

The geometry shown in FIGS. 2-4 is only one of a large number of options for a special geometric construction of a vibration decoupling element, which is arranged between the actual ultrasonic transducer and the measuring tube nozzle.

Other structures of vibration decoupling elements will now be described.

Recently, the method of selective laser melting has been developed, with which such vibration decoupling elements are manufacturable. Also, other methods, modified compared with SLS, can be utilized, in the case of which e.g. a laser is not applied for the material buildup. These methods can be utilized for the manufacture of vibration decoupling bodies with the geometric relationships described in FIGS. 2-4 and below. Selective laser melting is known to those skilled in the art as a manufacturing method. Such method can be applied, in order to manufacture vibration decoupling bodies with complicated geometric elements. Bodies, which have been implemented by laser melting, have, due to the layered construction, a greater surface roughness than conventionally manufactured parts, for example, parts cast and then chip removal processed, i.e. machined. While the increased surface roughness can be lessened by subsequent working (e.g. grinding, sandblasting, shot peening or polishing), there is, due to the complex and partially back cut geometries within the vibration decoupling body, always a somewhat increased surface roughness of individual geometric elements to be found.

Manufacture by means of selective laser melting additionally permits manufacture of the holding element 6 as an integral component of the preferably monolithically-formed vibration decoupling element. It is possible also to combine a number of different materials with one another. Thus, e.g. the holding element can be manufactured of titanium and the vibration decoupling element of another metal. The transition between the materials can, in contrast to the case of conventional welding, brazing or soldering, be embodied seamlessly, i.e. without connecting seam or weld seam. It is, however, also possible to manufacture individual portions and to connect these with one another by some other method, e.g. by adhering, border crimping or screwing together. In this way, e.g. difficultly weldable locations can be handled otherwise.

Figure 15:
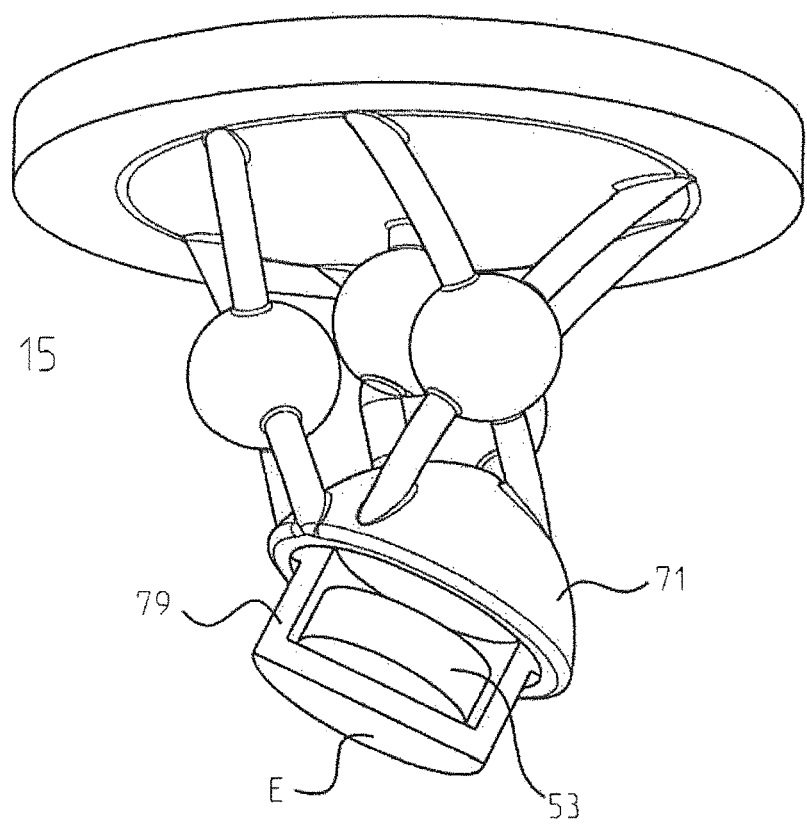
FIG. 15 is a lateral, perspective view of the arrangement of FIG. 13, with a sensor cup instead of a resonator.
Figure 18:
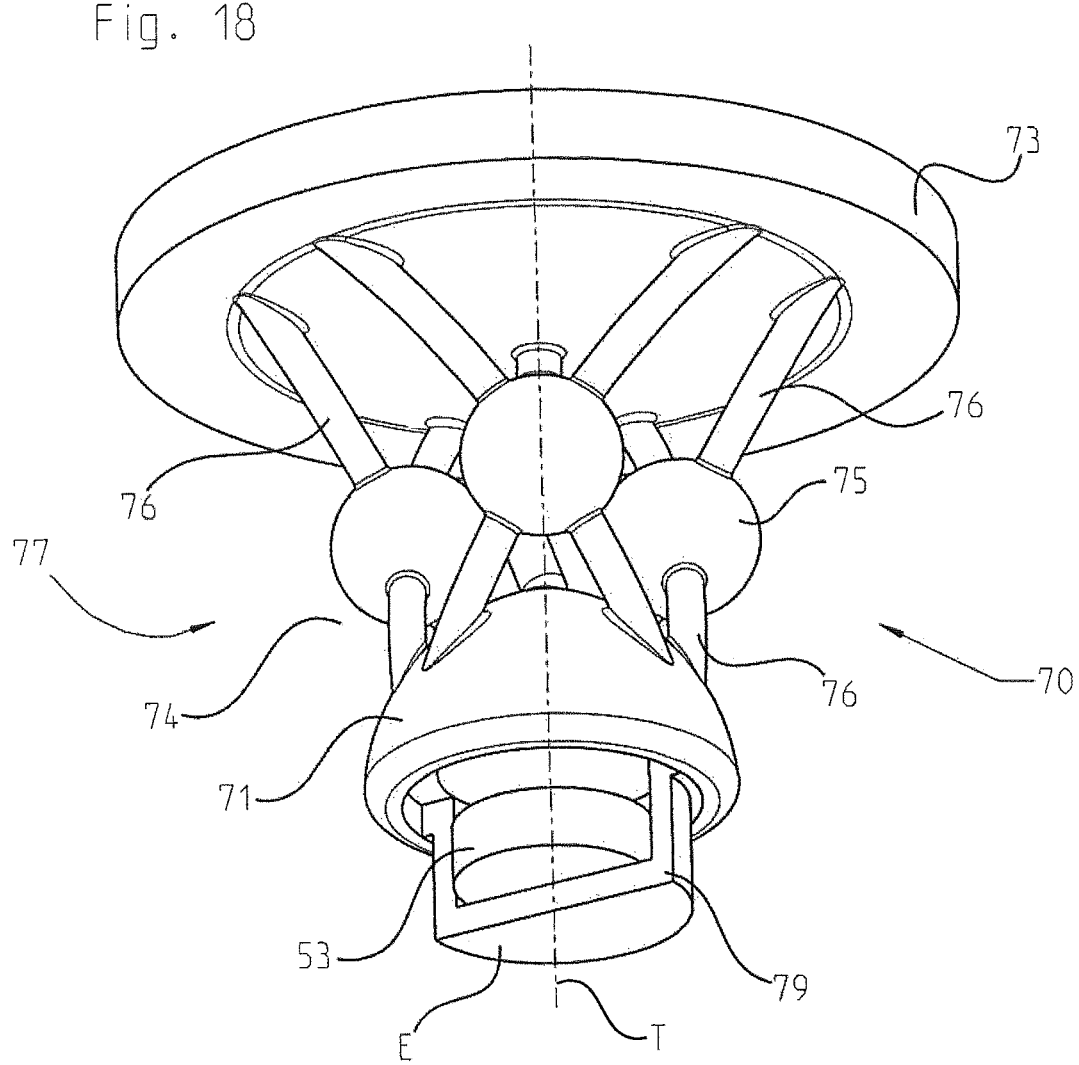
FIG. 18 is a lateral, perspective view of the arrangement of FIG. 15, with a straight sensor cup instead of the inclined sensor cup.

Holding element 6 can also be embodied as a cup with a tubular lateral surface and a terminal, planar, radiation surface. The piezoelement is arranged in this cup. The lateral surface is connected with the vibration decoupling element 10. This variant is shown in FIGS. 15 and 18.

FIGS. 6-9 show another variant of an arrangement 46 of the invention with a vibration decoupling element 30. Arrangement 46 is arranged in an opening 45 of a measuring tube 42. This arrangement includes additionally an ultrasonic transducer 31 with a holding element 32 for seating and holding a piezoelement 33. Holding element 32 includes a radiating plate 34, which, analogously to FIGS. 2-4, is spaced from the platform 36 by a pedestal 35. Also in this embodiment, the holding element 32 can be otherwise embodied, such as e.g. in a cup-like embodiment 79, such as shown in FIG. 15. The piezoelement 53 is arranged in the cup-like holding element 79.

Holding element 32 of the ultrasonic transducer is secured in a seat 37, i.e. in a seat with an interface for holding the ultrasonic transducer and forming part of the vibration decoupling element 30. Seat 37 is held in a vibration decoupling manner. For this, the seat 37 is spaced from a dome-shaped platform 40 by a membrane 38 and by a structural element 39. Structural element 39 has, in such case, the shape of a sphere. Alternatively, the structural element can also be embodied shaped as an ellipsoid or a polyhedron.

Figure 5A:
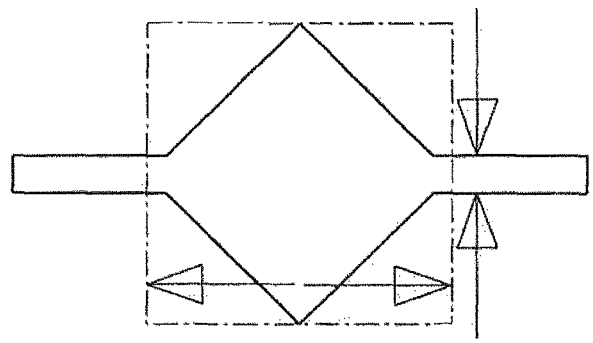
FIG. 5a is a model representation of a first defined structural element.
Figure 5B:
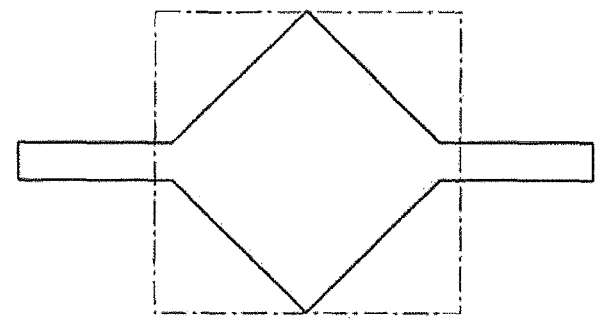
FIG. 5b is a model representation of a second defined structural element.
Figure 5C:
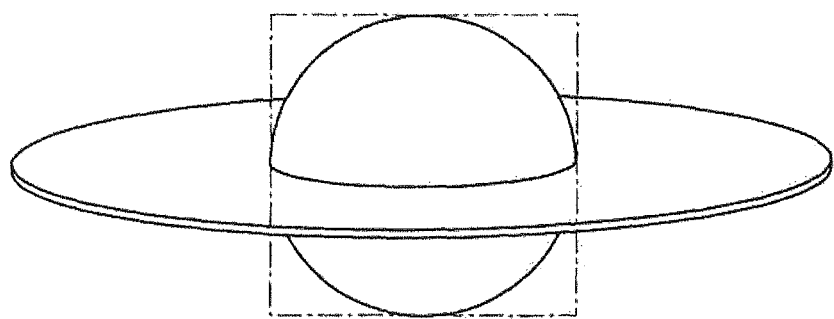
FIG. 5c is a model representation of a third defined structural element.
Figure 6:
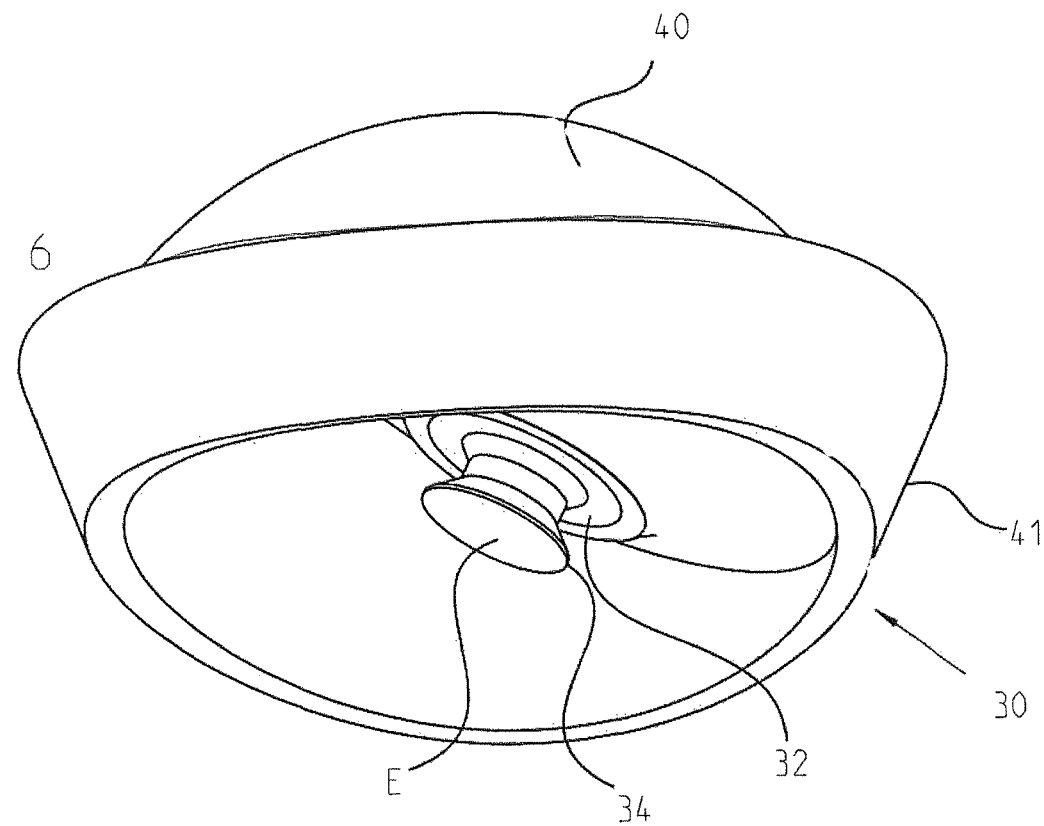
FIG. 6 is a lateral, perspective view of a second embodiment of an arrangement of the invention.

In the case of the geometric character of the structural element 39, it can, analogously to FIG. 5, be a solid body, which has one or more interfaces with other elements of the vibration decoupling body, wherein the thickness of the material at the one or more interfaces is especially more than two times smaller than the thickness of the solid body.

In the example of an embodiment illustrated in FIGS. 6-9, the structural element 39 is connected by an areal contact region with the dome-shaped platform 40 and with the seat 37. Arranged on the edge of the seat 37 is the membrane 38, which extends radially from the seat 37 to the dome-shaped platform 40. Membrane 38 provides, due to its very small cross sectional area, for a good acoustic decoupling between seat 37 and dome-shaped platform 40.

The dome-shaped platform 40 serves for anchoring the vibration decoupling element to the measuring tube. Platform 40 is bounded by a conical edge 41. This serves for insertion of the vibration decoupling element 30 into a corresponding opening in a measuring tube 42. In this case, an outwardly extending measuring tube nozzle, such as in the case of the preceding variant, is not required. The membrane and the dome-shaped platform 40 bound a hollow space 43. This can either be filled with a special vibration damping medium, e.g. metal powder, or with a gas.

The opening within the measuring tube should, advantageously for the insertion of the vibration decoupling element with the platform 40, likewise be conically embodied. The connection between measuring tube and vibration decoupling element can be accomplished in this special example of an embodiment preferably by means of a laser- or electron beam welding method. In the case of the latter method, it is better to embody the interface not with conical but, instead, perpendicular walls, because the electron beam cannot be tilted relative to the component. However, the workpiece can also be inclined by a robot arm. In the case of each type of welding, it is to be noted that the introduced amount of heat should be as small as possible, in order to prevent damaging the piezoceramic by approaching the Curie temperature.

A passageway 44 extends through the dome-shaped platform 40, through the structural element 39 and through the seat 37. Within this passageway 44, a power supply cable and/or a signal transmission cable can be arranged, which is connected with the piezoelement 33.

Figure 7:
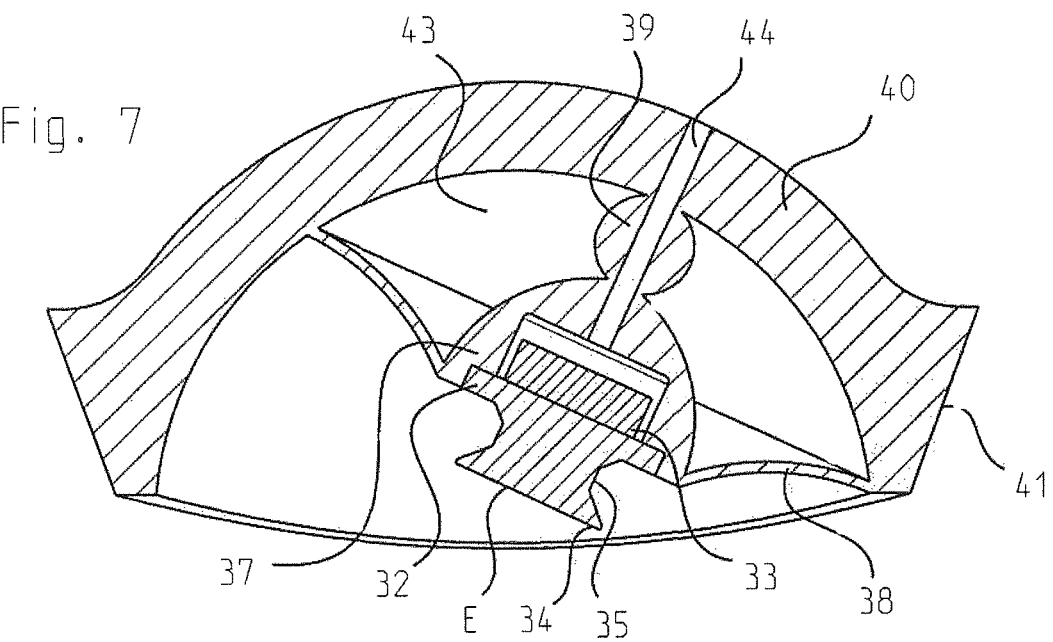
FIG. 7 is a sectional view of the arrangement of FIG. 6.
Figure 8:
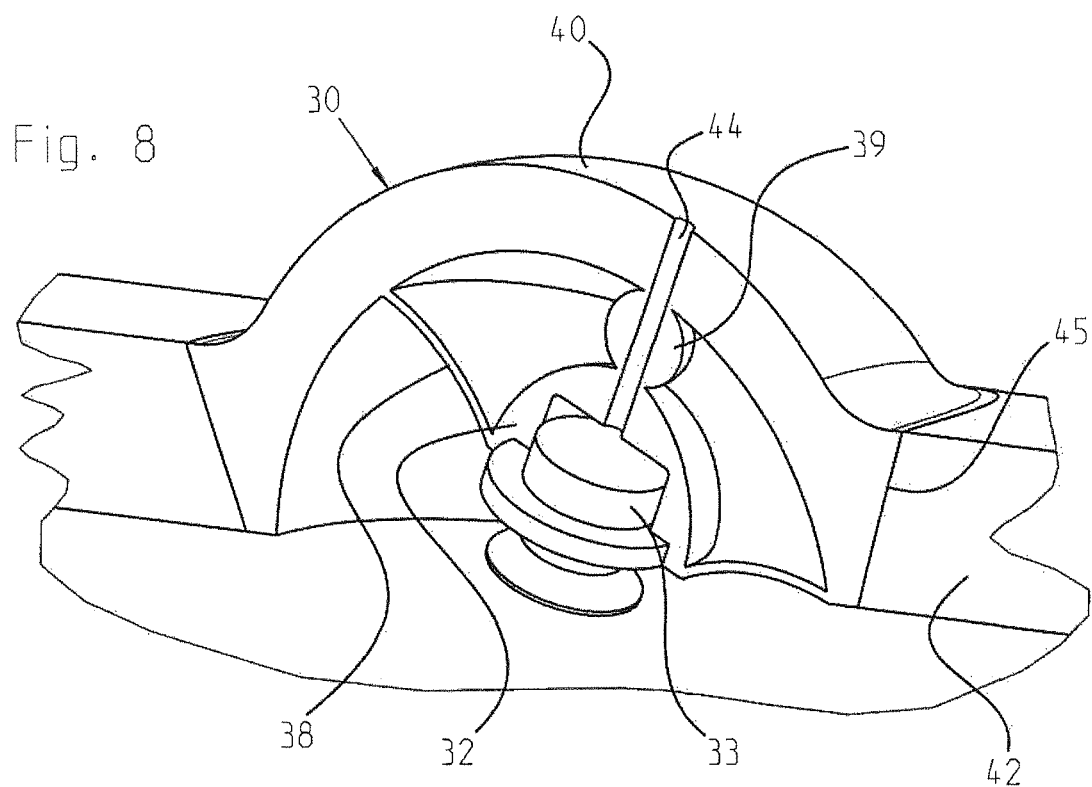
FIG. 8 is an installed position of the arrangement of FIG. 6 in a sectioned measuring tube.
Figure 9:
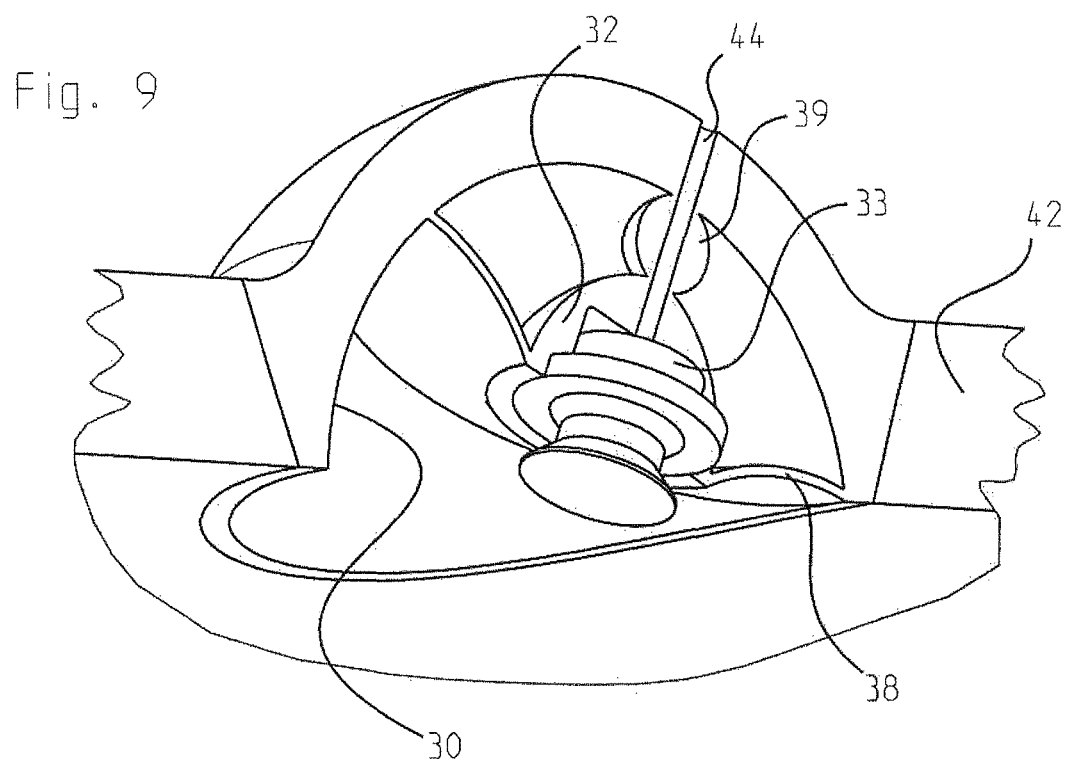
FIG. 9 is an installed position of the arrangement of FIG. 6 in a sectioned measuring tube from another perspective.

Also the vibration decoupling element 30 shown in FIGS. 7-9 is preferably monolithically constructed. Also, the holding element 32 together with the vibration decoupling element can form a monolithic unit. The monolithic construction is, however, not absolutely required. Instead, individual elements of the vibration decoupling element can also be connected with one another by adhesive, welding, brazing, soldering or in other manner.

Also this vibration decoupling element is manufacturable by selective laser melting.

Figure 10:
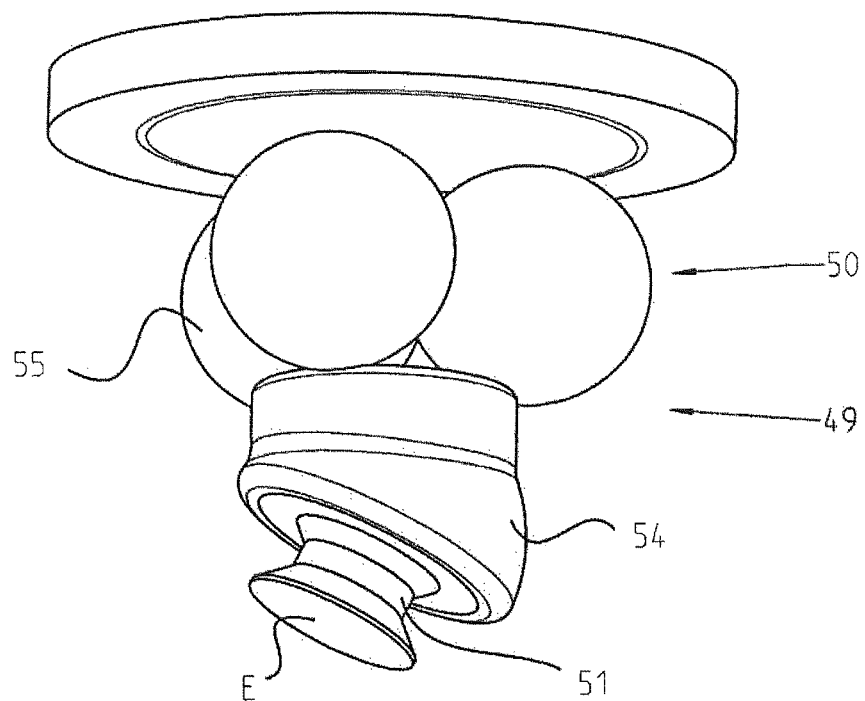
FIG. 10 is a lateral, perspective view of a third embodiment of an arrangement of the invention.
Figure 11:
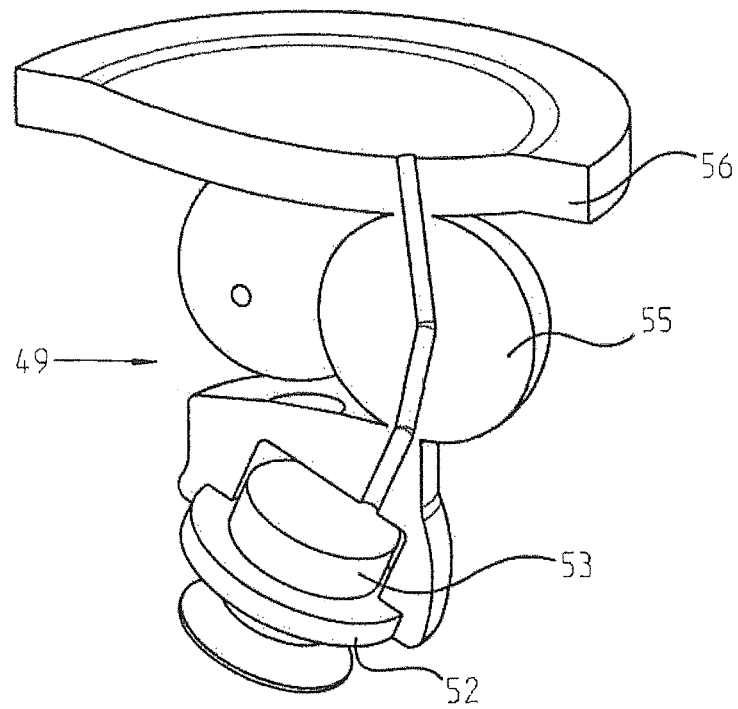
FIG. 11 is a sectional view of the arrangement of FIG. 10
Figure 12:
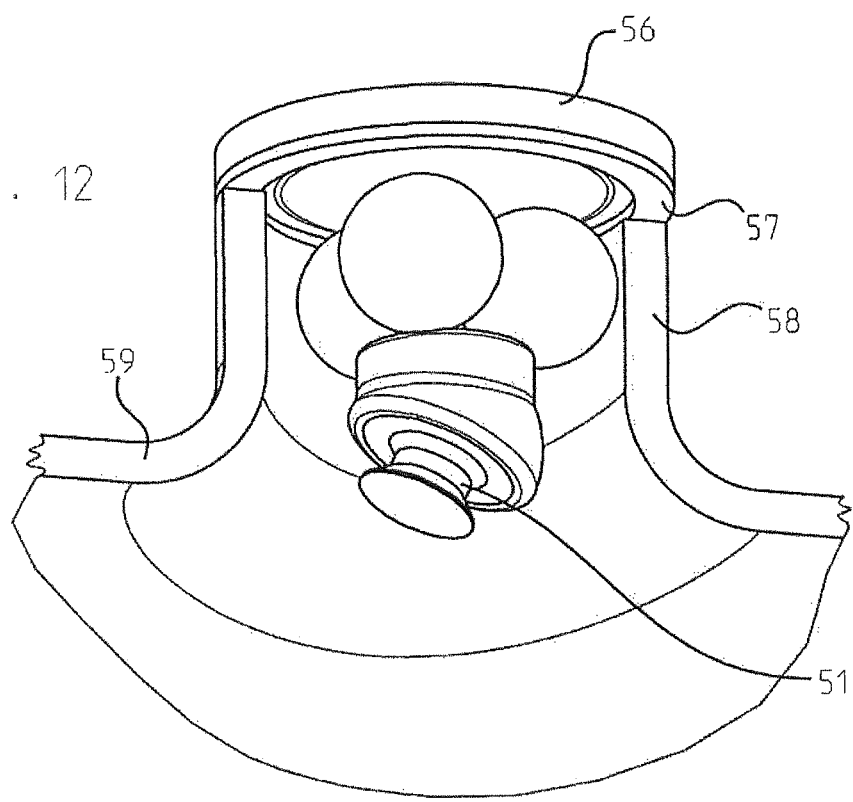
FIG. 12 is an installed position of the arrangement of FIG. 10 in a sectioned measuring tube.

FIGS. 10-12 show a further example of an embodiment of an arrangement 49 of the invention having a vibration decoupling element 50, which is arranged in a sensor nozzle 58 on a measuring tube 59. An ultrasonic transducer 51 with a holding element 52 and a piezoelement 53 is constructed analogously as in FIGS. 2-4 and 7-9. The ultrasonic transducer 51 is arranged in a seat 54, i.e. a seat with an interface for holding, or setting, the ultrasonic transducer. The holding can be effected e.g. by adhering, soldering, brazing or welding the ultrasonic transducer to the interface of the seat 54. Known, however, are other options of holding, respectively setting. Such determines, due to its orientation, a certain angle, with which an ultrasonic signal is introduced into the measuring tube. Seat 54 is arranged on three structural elements 55, which, such as for the structural elements of FIGS. 2-4 and 7-9, are connected solidly with the seat 54. The structural elements 55 are, same as in FIGS. 2-4 and 7-9, solidly connected with a platform 56, which is embodied in this case as a plate shaped platform. The platform can, however, also have other embodiments.

The structural elements 55 are analogous to the structural element 39 of FIGS. 7-9 as regards their geometric character. In the concrete case, FIGS. 10-12 have sphere shaped, structural elements. They can, however, also be ellipsoidal elements or polyhedron shaped elements, which are connected by areal contact regions with the seat 54 and the platform 56. Platform 56 is embodied plate shaped with a central bulge. Arranged in the edge regions of the platform is a seal 57, which in the mounted state is arranged between the platform 56 and a sensor nozzle 58. The shown platform 56 is only one example of a series of other embodiments possible for this element of the vibration decoupling element 50. Thus, also in the case of this example, the platform can be embodied dome-shaped, analogously to FIGS. 7-9. In this case, then no sensor nozzle 58 is needed for connection of the vibration decoupling element but, instead, only a corresponding opening in the measuring tube 59.

The structural elements 55 are likewise another connected with one by areal contact regions. Furthermore, a structural element 55 as well as the platform 56 and the seat 54 include a passageway for an electrical current- and/or a signal cable. The structure of the vibration decoupling element 50 is an open structure. The means that between the individual elements, thus, among other things, also between the individual structural elements of the vibration decoupling element 50, free spaces are present. Thus, other than in the case of the preceding vibration decoupling elements, no closed hollow space is created, but, instead, the mentioned open structure. The open structure enables an especially preferred vibration decoupling, i.e. structure-borne sound decoupling, since oscillations are transmitted only via a very small amount of area.

In order to prevent fouling, the open structure can be surrounded with a membrane, thus e.g. a diaphragm, a thin sheet metal guard or a thin jacket of sheet metal, which e.g. is embodied cylindrical or conically. Such can, for example, be mounted to the platform 56, between platform 56 and measuring tube nozzle 58, to the measuring tube nozzle 58 or to the measuring tube 59.

In the case of an open structure without such a membrane, a contamination diagnosis of to what extent the open structure has contaminating deposits or the like can occur via an evaluation of the SNR ratio relative to a desired value.

Also this vibration decoupling element 50 can be produced by selective laser melting.

Figure 13:
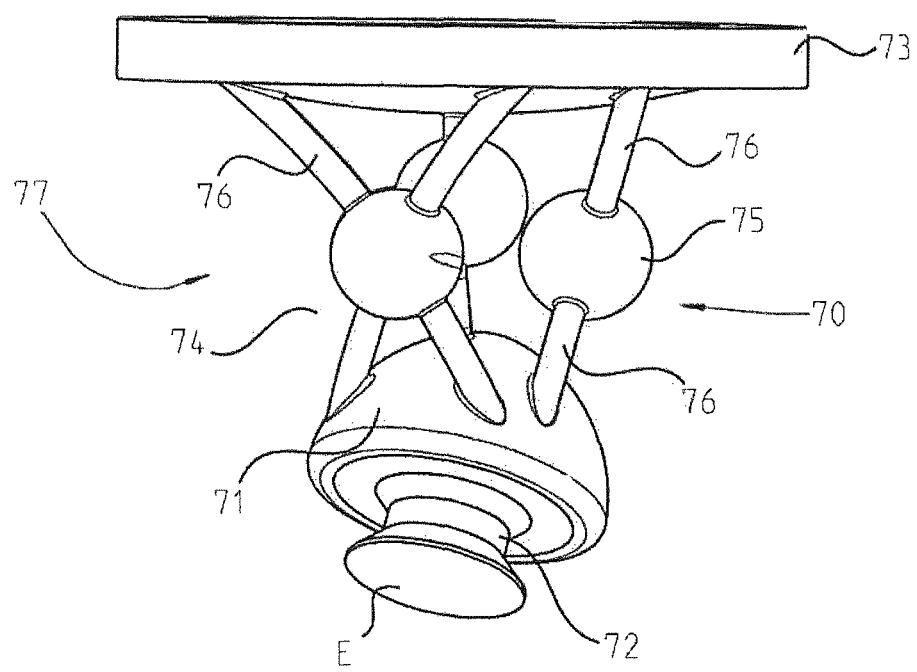
FIG. 13 is a lateral, perspective view of a fourth embodiment of an arrangement of the invention.
Figure 14:
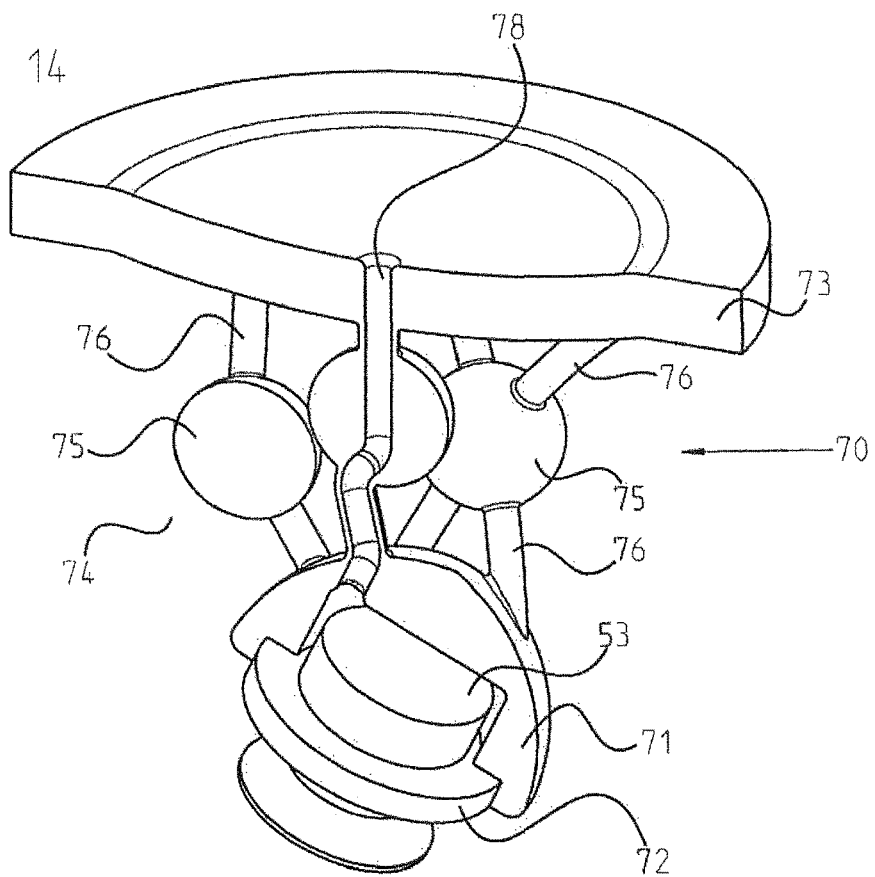
FIG. 14 is a sectional view of the arrangement of FIG. 13.

FIGS. 13-14 shows a further example of an embodiment for an arrangement 77 of the invention having a vibration decoupling element 70 for arrangement in a sensor nozzle, which can be embodied analogously to the sensor nozzle 58. In such case, the vibration decoupling is achieved by arranging between the seat 71 with an interface for holding the ultrasonic transducer 72 and the plate-shaped platform 73 an open structure 74. Open structure 74 is composed of individual, spherically shaped, structural elements and struts, i.e. rod-shaped connecting elements, 76. Located between these elements is a free space. A structural element in the form of an oscillatory body 75 is provided, which via the rod-shaped connecting elements 76 are connected with the seat 71 and the platform 73. One can see that the struts are bent.

This bending of the rod-shaped connecting elements 76 supplementally damps vibrations. The acoustic vibrations are absorbed by compression, stretching, bending and torsion of the bent, rod-shaped, connecting elements 76.

Furthermore, three oscillatory bodies 75 are provided. The oscillatory bodies 75 are structural elements of the vibration decoupling element 70 and are formed analogously to the structural elements 11 and 29. Thus, the oscillatory bodies 75 of FIGS. 13 and 14 are solid bodies, or solid elements, which have, in each case, one or more interfaces with other elements of the vibration decoupling element 70. The smallest cross section, or the smallest dimension, of these one or more interfaces can preferably be greater than two times less than the smallest cross section, or the smallest dimension, of an imaginary cuboid, which borders all-sides of the particular structural element. The thickness of the material at the one or more interfaces is especially more than two times smaller than the thickness of the solid bodies, or the smallest distance from the center of gravity of the solid body to its outer contour. For better representation of the dimensioning of the structural elements 11, the subject matter of FIGS. 5a-c can be taken into consideration.

The oscillatory bodies 75 are embodied sphere shaped in FIGS. 13 and 14. They can, however, also be ellipsoidal or polyhedron-shaped or as one encircling torus. Additionally, the oscillatory bodies 75 can during operation of the ultrasonic transducer oscillate between the seat 71 and the platform 73 relative to a straight connecting line both in the longitudinal direction, thus parallel to the connecting line, as well as also in a transverse direction, thus not parallel to the connecting line, whereby a vibration damping of various oscillation modes occurs. Provided in this element is additionally a passageway 78 for guiding a signal- and/or electrical current cable. This extends through the rod-shaped connecting elements 76 and the oscillatory body 75 and from the platform 73 to the seat 71.

As already provided in the case of the example of an embodiment of FIGS. 7-9, also the open structure of FIGS. 13-14 and generally all additional variants of open structures can be protected from fouling by an additional diaphragm or by a supplemental housing. In such case, this can be, among others, also a thin walled membrane, such as shown in FIGS. 16a-f.

Figure 16A:
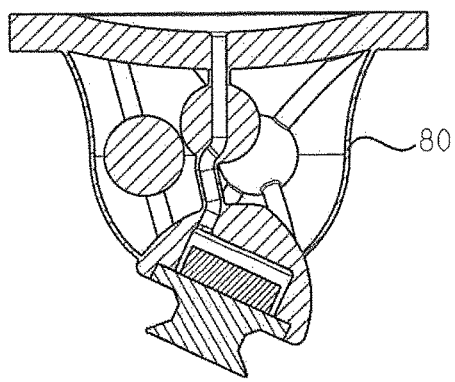
FIGS. 16a-16f shows an arrangement of FIGS. 13 and 14 supplemented by a membrane for protection against fouling.

FIG. 16a shows a thin walled membrane 80, in the form of a sheet structure with essentially uniform wall thickness, which prevents the penetration of particles into the open structure 74. Membrane 80 can have a preferred wall thickness of less than 2 mm and can preferably be of synthetic material, e.g. plastic, or especially preferably of metal. It extends between the platform 73 and the seat 71.

Open structure 74 is embodied as a support structure and can be understood functionally. The components of the open structure undertake essentially the support function of the ultrasonic transducer. In such case, the totality of the supporting components, thus e.g. only the structural elements 55 such as in FIGS. 10-12 or the structural elements 75 with the connecting elements 76 such as in FIGS. 13-15, forms no hollow space. The open support structure defines, thus, no closed hollow space. A membrane protecting against fouling does not, in such case, belong to the open support structure. There is no pressure difference present between media outside and within the open structure.

To the extent that the open structure is surrounded by a hollow membrane, the intermediate spaces of the open structure can be filled with another material. This material can be sound damping, potting material or quite especially preferably a metal powder, respectively metal dust. Also, although the open structure in the case of this variant is filled, it is, in spite of this, in effect, open structure. In contrast therewith, a free space in the form of a cavity, such as shown in FIGS. 2-4, is surrounded completely by structural and connecting elements. Such a structure is not effective as an open structure.

Although the membrane 80, thus, defines a hollow space, the open structure is retained.

Figure 16B:
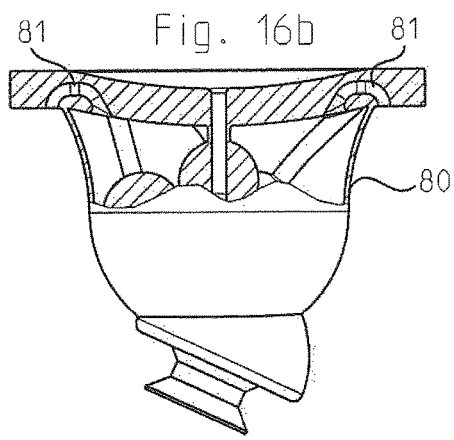

FIG. 16b is a further development of FIG. 16a. In such case, there are arranged in the platform 73 two passageways 81, which connect the measuring tube interior with the hollow space formed by the membrane 80. This serves for pressure equalization. In an especially preferred, non-illustrated embodiment, a bellows or a filter is located on/in the holes, in order to protect the aforementioned hollow space against fouling and also plugging.

Figure 16C:
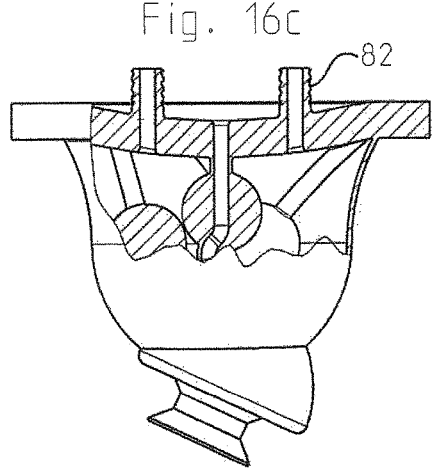

FIG. 16c is likewise a further development of FIG. 16a. In such case, the platform 73 includes two nozzles 82 with straight passageways, which extend from the underside of the platform to the edge of the nozzle. These are for filling or also emptying the hollow space formed by the membrane, e.g. with metal powder. At the same time, they could also be a mounting aid, for example, in order to mount a small circuit board.

Figure 16D:
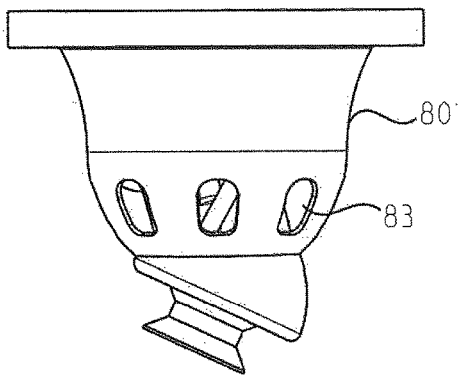

In the further development shown in FIG. 16d, holes 83 are located in the membrane 80, so that the measured medium M can enter into the hollow space defined by the membrane and containing the open structure 74 arranged therein. Number, shape and size of the holes 83 are variable. These holes can also be e.g. somewhat smaller and also less in number. They serve also for pressure equalization and the membrane as a dirt barrier of the decoupling elements, i.e. the open structure.

Figure 16E:
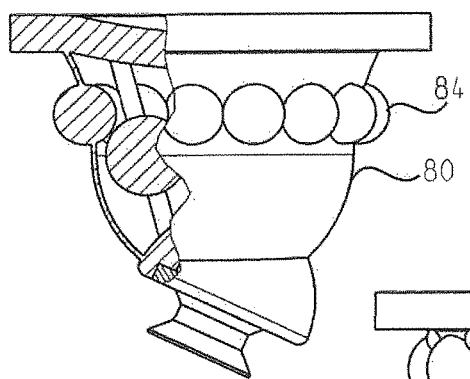

As already mentioned above, as much as possible spherical-, electrical-, toroidal- and/or polyhedral structural elements have proved as especially suitable for sound decoupling. Shown in FIG. 16e is a further development of the membrane 80 with a sphere ring 84, thus a one ring arrangement of mutually adjoining, ordered spheres. The spheres can be connected with one another. This is, however, not absolutely necessary. Likewise an option, however, less preferably, is a ring of ellipsoids or a torus.

Figure 16F:
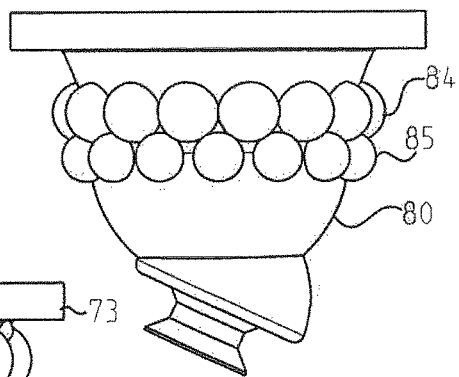

FIG. 16f shows a further development of FIG. 16e with a second sphere ring 85. This has preferably a size variance of the sphere radii relative to the first sphere ring 84. The sphere rings 84, 85 can be connected with one another, e.g. by means of thin, intermediate pieces of membrane. This is, however, not absolutely necessary.

Figure 17:
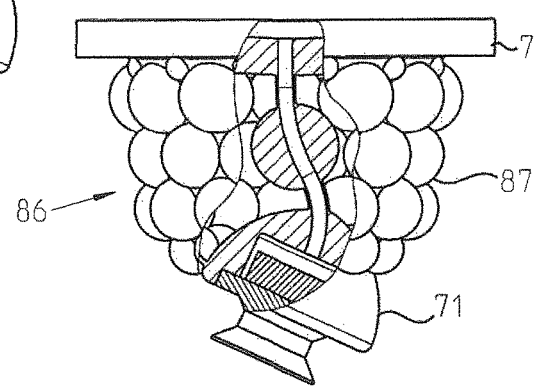
FIG. 17 shows an arrangement of FIGS. 13 and 14 supplemented by a membrane predominantly of spheres for protection against fouling.

FIG. 17 shows a further development of FIG. 16f, in the case of which the entire protective membrane/protective housing is composed essentially of spheres arranged adjoining one another. These have preferably a variety of sizes of sphere radii. The sphere rings can be connected with one another, e.g. by means of thin, intermediate pieces of membrane. This is, however, not absolutely necessary. The inner space is furthermore formed of the open structure illustrated in FIG. 16a, which is composed of different vibration decoupling- and connecting elements. In one of these elements, there is integrated, again, a cable passageway, which serves for guiding a signal- and/or an electrical current cable. Since, in this particular case, all spheres adjoin one another and support one another, an option here is to omit the central open structures.

FIG. 18 shows a further example of an embodiment of an arrangement of the invention analogous to FIG. 15. The sole difference is that, in the case of the variant of FIG. 15, the seat and the ultrasonic transducer are shown inclined, while in FIG. 18 the rotational axis of the seat and the ultrasonic transducer are oriented parallel to the longitudinal axis of the vibration decoupling system. In this way, a straight radiating of the ultrasonic signal into the containment is enabled. This is especially advantageous e.g. in the case of ascertaining fill level.

The vibration decoupling elements of FIGS. 13-14 are likewise manufacturable by selective laser melting. Additionally, in this way, also the membranes shown in FIG. 16 can be produced.

The dimensions of the examples of embodiments illustrated in FIGS. 1-4 and 6-18 hold, by way of example, for transducers with 200 kHz primary oscillation frequency and piezoelement dimensions of D=5 mm and h=1.5 mm.

Shown in FIGS. 1-4 and 6-17 are exclusively vibration decoupling elements, which provide an inclined position of the ultrasonic transducer unit, i.e. so-called angled transducers. Of course, also implementable with the described method are geometries, in the case of which the ultrasonic transducer is placed exactly perpendicularly for securement on the nozzle, and in the case of which the inclined position of the ultrasonic, measuring path is achieved by tilting of the measuring tube nozzles.

The invention claimed is:

1. An arrangement for transmitting and/or receiving an ultrasonic, wanted signal in a measured medium, comprising:
   an ultrasonic transducer; and
   a vibration decoupling element for securing said ultrasonic transducer in a containment, wherein:
   said vibration decoupling element or said ultrasonic transducer via a coupling surface issues ultrasonic, wanted signals toward a measured medium; and wherein said vibration decoupling element has a first interface, where said vibration decoupling element is connectable to the containment or to a sensor nozzle on the containment, which containment is partially or completely filled with measured medium;
   an amplitude of the wanted signal transmitted in the measured medium under reference conditions and in a frequency range of the wanted signal is more than 20 dB greater than an amplitude of a disturbance signal transferred via the first interface and via a wall of the containment;
   said vibration decoupling element has a platform for securing said vibration decoupling element to said sensor nozzle or to the containment and a second interface for securing said ultrasonic transducer;
   between said second interface for securing said ultrasonic transducer and said platform at least one vibration decoupling structural element is arranged, which vibration decoupling structural element is embodied as a solid body; and
   said vibration decoupling structural element is a sphere, ellipsoid, toroid or polyhedron.

2. The arrangement as claimed in claim 1, wherein:
   the amplitude of the wanted signal transmitted in the measured medium under reference conditions and in the frequency range of the wanted signal is more than 30 dB, greater than the amplitude of the disturbance signal transmitted via the first interface and via the wall of the containment.

3. The arrangement as claimed in claim 1, wherein:
   said vibration decoupling element is monolithically constructed.

4. The arrangement as claimed in claim 1, wherein:
   at least one connecting element is arranged between the vibration decoupling structural element and said platform or between the vibration decoupling structural element and said second interface for securing said ultrasonic transducer; and
   said at least one connecting element is embodied as a rod-shaped connecting element.

5. The arrangement as claimed in claim 4, wherein:
   the length of said at least one rod-shaped connecting elements corresponds to greater than or equal to lambda/4 of the ultrasonic signal.

6. The arrangement as claimed in claim 1, wherein:
   at least one connecting element is arranged between said vibration decoupling structural element and said platform or between the vibration decoupling structural element and said second interface for securing said ultrasonic transducer; and
   said at least one connecting element is embodied as a membrane.

7. The arrangement as claimed in claim 4, wherein:
   the length of said at least one rod-shaped connecting elements corresponds to greater than or equal to lambda/8 of the ultrasonic signal.

8. The arrangement as claimed in claim 1, wherein:
   said vibration decoupling element is a metal component and at least in certain regions composed of one of the following materials:
   a) a steel;
   b) titanium or a titanium alloy;
   c) a nickel based alloy;
   d) aluminum or an aluminum alloy;
   e) a chromium-cobalt-molybdenum alloy;
   f) a bronze alloy;
   g) a noble metal alloy;
   h) a copper alloy.

9. The arrangement as claimed in claim 1, wherein:
   said vibration decoupling element is sectionally composed of a plurality of weldable metals and/or metal alloys, which are connected with one another seamlessly.

10. The arrangement as claimed in claim 1, wherein:
    said vibration decoupling element has an integrally formed passageway for guiding an electrical current- and/or signal cable, which passageway extends through the vibration decoupling structural element.

11. The arrangement as claimed in claim 1, wherein:
    said vibration decoupling element comprises a seat in which the ultrasonic transducer is arranged;
    between said seat and said platform an open structure is provided; and
    one or more vibration decoupling structural elements are parts of said open support structure.

12. The arrangement as claimed in claim 1, wherein:
    said vibration decoupling element is produced by selective laser melting.

13. The arrangement as claimed in claim 1, wherein:
    said vibration decoupling element is insertable into a hole in the containment.

14. The arrangement as claimed in claim 1, wherein:
    said one or more vibration decoupling structural elements are essentially solid, wherein the mass of one vibration decoupling structural element is at least 80% of the mass of an equally shaped, solid reference body composed of the same material as the vibration decoupling structural element.

15. An ultrasonic, flow measuring device having a measuring tube and at least two arrangements as claimed in claim 1, mounted on said measuring tube.

16. An ultrasonic, fill-level measuring device having at least one arrangement as claimed in claim 1 mounted on a container wall.

17. The arrangement as claimed in claim 1, wherein:
said one or more vibration decoupling structural elements are essentially solid, wherein the mass of one vibration decoupling structural element is at least 90% of the mass of an equally shaped, solid reference body composed of the same material as the vibration decoupling structural element.

* * * * *